June 18, 1935. M. ALBERT Re. 19,609

HEARING DEVICE SUPPORT

Original Filed Jan. 14, 1933.

INVENTOR.
MINNIE ALBERT
BY Joseph Blacker
ATTORNEY

Reissued June 18, 1935 Re. 19,609

UNITED STATES PATENT OFFICE 19,609

HEARING DEVICE SUPPORT

Minnie Albert, Brooklyn, N. Y.

Original No. 1,910,875, dated May 23, 1933, Serial No. 651,752, January 14, 1933. Application for reissue January 14, 1935, Serial No. 1,826

6 Claims. (Cl. 179—107)

The present invention relates to an improved appliance for supporting electrical hearing devices.

An object of this invention is to provide an appliance which will hold the hearing device securely attached to the undergarments and body of a person without hampering the movements of the person.

Another object of this invention is to provide a novel device of this character which will be cheap to manufacture and simple in construction and operation.

With the above and other objects in view, the invention will be hereinafter more particularly described, and the combination and arrangement of parts will be shown in the accompanying drawing and pointed out in the claims which form part of this specification.

Reference will now be had to the drawing, wherein like numerals of reference designate corresponding parts throughout the several views, in which.

Figure 1:
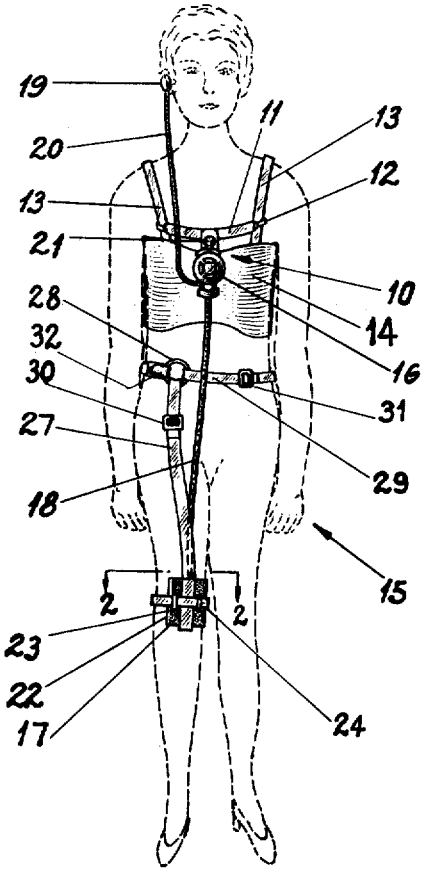
Figure 1 is a view illustrating the manner of attaching my improved appliance.
Figure 2:
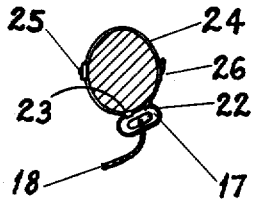
Figure 2 is an enlarged sectional view taken as on line 2—2 in Figure 1.

In the illustrated embodiment of the invention, Figure 1 shows a supporting appliance 10, comprising an elastic strap 11, provided with suitable clasps 12, at each end whereby the strap may be readily secured to the shoulder straps 13, 13, or to any other part of an undergarment 14, on a person 15. The supporting appliance 10 supports a sound transmitter 16 and a battery 17, connected by an electric cord 18, and an earpiece 19, connected to the sound transmitter 16 by an electric cord 20. The sound transmitter 16 is mounted on a hanger 21, which is fastened at the middle of the elastic strap 11. The weight of the sound transmitter may thus be equally distributed to the shoulders of the wearer and the central mounting prevents excessive displacement of the sound transmitter, due to the movements of the wearer.

The battery 17 is housed in a bag 22 which may have loops 23, 23, to receive an elastic thigh strap 24, preferably in slidable engagement. The thigh strap 24 has an adjustable buckle 25 for adjusting the elastic strap to size around the thigh, and has a fastening buckle 26 for securing the thigh strap around the thigh. A supporting-strap or ribbon 27 is fastened to the bag 22, and is folded around the bag and embraces a ring 28 which serves to join the ends of a waist belt 29 and provides a swivelling connection for the supporting-strap at the waist. The supporting-strap 27 is secured to the front side of the bag as well as to the rear side so as to embrace the battery and prevent swinging motion of the battery away from the body of the wearer. It is to be noted that the elastic thigh strap 24 may be slidably secured to the bag 22, in order to permit the battery to be used on either thigh in agreement with the earpiece, which may have to be applied to either ear of the wearer. An adjustable buckle 30 has been provided to permit vertical adjustment of the ribbon 27 according to the height of the wearer. The ribbon 27 thus serves to support the battery 17 and bag 22 in swivelable relation with the ring 28 and in engagement with the waist belt 29. The waist belt 29 is also provided with an adjustable buckle 31 for adjusting the waist belt to size around the waist of the wearer, and a fastening buckle 32 is provided for securing the waist belt around the waist of the wearer.

It will be noted that the reason for securing the elastic strap 11 in substantially horizontal position and mounting the sound transmitter intermediate the ends of the said strap is due to the fact that the sound transmitter and battery have a considerable weight, and it is necessary to support them centrally on the person so that there will not be any swinging of the parts which would tend to annoy and hamper the movements of the wearer.

It will also be noted that while I have shown my device as supporting a single sound transmitter, that it may be employed in the same manner for a double sound transmitter.

By my construction and arrangement of parts I attain simplicity combined with a high degree of adaptability. Ample adjustment is provided to meet varying requirements as to height and size of the wearer and the application and removal of the appliance is facilitated thereby.

It will thus be noted that my hearing device support or appliance comprises two elements,—one a strap having means for attachment to the shoulder straps of an undergarment and for supporting the sound transmitter, and a second element comprising a waist belt and associated means for supporting a battery from said belt and suitably secured to the thigh of the wearer.

In accordance with the provisions of the patent statutes I have described the operation of my invention, together with the device which I now consider to represent the best embodiment thereof; but I desire to have it understood that the device shown is only illustrative and that the invention may be carried out by other means within the scope of the appended claims.

Having thus described my invention, I claim as new and desire to secure by Letters Patent:

1. An appliance for supporting an electrical hearing device on a person, comprising a strap fixed at both ends to the shoulder straps and adapted for hanging a transmitter intermediate said ends and centrally of said person and apportioning the weight of said transmitter equally to both shoulders, a belt having means for attachment to the waist, a bag and battery supporting-strap having means for attachment to a thigh, said bag serving to house said battery therein and being fixed to and depending from said waist belt and in slidable relation with said thigh strap, whereby said bearing device is supported without hampering the movements of said person.

2. An appliance for supporting an electrical hearing device on a person, comprising a strap fixed to an undergarment and adapted for hanging a sound transmitter thereon, a belt having means for attachment to the waist, a bag and battery supporting-strap having means for attachment to a thigh, said bag serving to house said battery therein and being fixed to and depending from said waist belt and in slidable relation with said thigh strap, whereby said hearing device is supported without hampering the movements of said person.

3. An appliance for supporting an electrical hearing device on a person, comprising a strap fixed at both ends to the shoulder straps of an undergarment and adapted for hanging a transmitter intermediate said ends and centrally of said person and apportioning the weight of said transmitter equally to both shoulders, a belt having means for attachment to the waist, a bag and battery supporting-strap having means for attachment to a thigh, said bag serving to house said battery therein and being in swivelable junction with and depending in supported relation from said waist belt, whereby said hearing device is supported without hampering the movements of said person.

4. An appliance for supporting an electrical hearing device on a person, comprising means adapted for hanging a sound transmitter on a garment of a person, a belt having means for attachment to the waist, a bag and battery supporting-strap having means for attachment to a thigh, said bag serving to house said battery therein and being in swivelable junction with and depending in supported relation from said waist belt, whereby said hearing device is supported without hampering the movements of said person.

5. In an appliance for supporting the battery of an electrical hearing device on the body of a person, comprising a belt having means for attachment to the waist, a bag and battery supporting-strap having means at one end for swivelable attachment to said waist belt and being secured at its other end to a thigh strap, said bag serving to house said battery therein in swivelable junction with and depending in supported relation from said waist belt, whereby said battery is supported without hampering the movements of said person.

6. In an appliance for supporting the battery of an electrical hearing device on the body of a person, comprising a belt having means for attachment to the waist and having a ring joining the ends thereof, a strap having means for attachment to a thigh, a bag and battery supporting-strap having means at one end for swivelable attachment to said waist belt ring and being secured at its other end to said thigh strap and folded about the front, bottom and rear sides of said bag, said bag serving to house said battery therein in swivelable junction with and depending in supported relation from said waist belt, whereby said battery is supported without hampering the movements of said person.

MINNIE ALBERT.